US008306822B2

(12) United States Patent
Li et al.

(10) Patent No.: US 8,306,822 B2
(45) Date of Patent: Nov. 6, 2012

(54) AUTOMATIC READING TUTORING USING DYNAMICALLY BUILT LANGUAGE MODEL

(75) Inventors: Xiaolong Li, Sammamish, WA (US); Li Deng, Sammamish, WA (US); Yun-Cheng Ju, Bellevue, WA (US); Alex Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1272 days.

(21) Appl. No.: 11/900,274

(22) Filed: Sep. 11, 2007

(65) Prior Publication Data

US 2009/0070112 A1   Mar. 12, 2009

(51) Int. Cl.
*G10L 15/22* (2006.01)
(52) U.S. Cl. .......................... 704/270; 704/251; 704/275
(58) Field of Classification Search .................. 704/251, 704/270, 275
See application file for complete search history.

(56) References Cited

U.S. PATENT DOCUMENTS

| | | | |
|---|---|---|---|
| 4,332,566 A | 6/1982 | Mazeski et al. ............... 434/178 |
| 5,176,222 A | 1/1993 | Tippin |
| 5,575,337 A | 11/1996 | Sapyta |
| 5,636,697 A | 6/1997 | Pitchford |
| 5,868,683 A | 2/1999 | Protopapas et al. .......... 600/559 |
| 5,899,973 A | 5/1999 | Bandara et al. |
| 5,920,838 A | 7/1999 | Mostow et al. ............... 704/255 |
| 6,017,219 A | 1/2000 | Adams, Jr. et al. |
| 6,073,091 A | 6/2000 | Kanevsky et al. |
| 6,134,529 A | 10/2000 | Rothenberg |
| 6,154,722 A | 11/2000 | Bellegarda |
| 6,176,319 B1 | 1/2001 | Ehrmann |
| 6,224,383 B1 | 5/2001 | Shannon |
| 6,231,956 B1 | 5/2001 | Brenner et al. ............... 428/216 |
| 6,266,642 B1 | 7/2001 | Franz et al. |
| 6,361,322 B1 | 3/2002 | Linden Henryr et al. |
| 6,468,084 B1 | 10/2002 | MacMillan |
| 6,865,528 B1 | 3/2005 | Huang et al. |
| 6,879,956 B1 * | 4/2005 | Honda et al. ................... 704/244 |
| 6,901,364 B2 | 5/2005 | Nguyen et al. |
| 6,953,343 B2 | 10/2005 | Townshend et al. |
| 7,062,220 B2 | 6/2006 | Haynes et al. ................. 434/353 |
| 7,243,071 B1 * | 7/2007 | Resnick et al. ............... 704/257 |

(Continued)

FOREIGN PATENT DOCUMENTS

JP   11-52837 A   2/1999

(Continued)

OTHER PUBLICATIONS

Yu et al. "N-Gram based filler model for robust grammar authoring", IEEE, ICASSP, May 2006.*

(Continued)

*Primary Examiner* — Jialong He
(74) *Attorney, Agent, or Firm* — Westman, Champlin & Kelly, P.A.

(57) ABSTRACT

A method of providing automatic reading tutoring is disclosed. The method includes retrieving a textual indication of a story from a data store and creating a language model including constructing a target context free grammar indicative of a first portion of the story. A first acoustic input is received and a speech recognition engine is employed to recognize the first acoustic input. An output of the speech recognition engine is compared to the language model and a signal indicative of whether the output of the speech recognition matches at least a portion of the target context free grammar is provided.

18 Claims, 5 Drawing Sheets

U.S. PATENT DOCUMENTS

| | | | | |
|---|---|---|---|---|
| 2002/0133340 | A1* | 9/2002 | Basson et al. | 704/235 |
| 2004/0006461 | A1* | 1/2004 | Gupta et al. | 704/200 |
| 2004/0049391 | A1* | 3/2004 | Polanyi et al. | 704/271 |
| 2004/0220809 | A1* | 11/2004 | Wang et al. | 704/257 |
| 2004/0249628 | A1 | 12/2004 | Chelba et al. | |
| 2005/0080611 | A1* | 4/2005 | Huang et al. | 704/4 |
| 2005/0106540 | A1 | 5/2005 | Wasowicz et al. | 434/178 |
| 2005/0171761 | A1 | 8/2005 | Ju et al. | |
| 2005/0228667 | A1 | 10/2005 | Duan et al. | |
| 2005/0255431 | A1* | 11/2005 | Baker | 434/169 |
| 2005/0286743 | A1* | 12/2005 | Kurzweil et al. | 382/114 |
| 2006/0041428 | A1 | 2/2006 | Fritsch et al. | |
| 2006/0058996 | A1 | 3/2006 | Barker | |
| 2006/0058999 | A1 | 3/2006 | Barker et al. | |
| 2006/0063139 | A1 | 3/2006 | Carver et al. | 434/178 |
| 2006/0069561 | A1* | 3/2006 | Beattie et al. | 704/251 |
| 2006/0069562 | A1 | 3/2006 | Adams et al. | 704/251 |
| 2007/0150278 | A1 | 6/2007 | Bates et al. | |

FOREIGN PATENT DOCUMENTS

| | | |
|---|---|---|
| KR | 10-2000-0037625 | 7/2000 |
| KR | 10-2001-0064247 | 7/2001 |
| KR | 10-2002-0076044 | 10/2002 |

OTHER PUBLICATIONS

Hagen, "Advances in children's speech recognition with application to interactive literacy tutors", PhD Thesis, Dept. of Computer Science, University of Colorado, 2006.*

PCT Application No. US2008/073570, International Search Report and Written Opinion dated Mar. 17, 2009.

Russell, Martin, et al., *Applications of Automatic Speech Recognition to Speech and Language Development in Young Children*, © British Brown Copyright 1996.

Hagen, A., et al., *Childrenapos;s Speech Recognition with Application to Interactive Books and Tutors*, IEEE Xplore Release 2.3, © Copyright 2006 IEEE.

Cleuren, Leen, et al., *Developing an Automatic Assessment Tool for Children's Oral Reading*, Katholieke Universiteit Leuven, Belgium, published 2006.

Aist, Gregory, *Skill-Specific Spoken Dialogs in a Reading Tutor that Listens*, Project LISTEN, Pittsburgh, PA, Published 1999.

Dusan et al. "Adaptive dialog based upon multimodal language acquisition", Proc. of IEEE international conference on multimodal interfaces, 2002. 4 pages.

Balakrishna et al. "Automatic creation and tuning of context free grammars for interactive voice response systems", Procing of NLP, IEEE, Nov. 2005. 6 pages.

Y.C. Tam, J. Mostow, J. Beck & S. Banerjee, "Training a confidence measure for a reading tutor that listens", Sep. 1, 2003, Eurospeech 2003, pp. 3161-3164.

A. Hagen, B. Bellom, S. Van Vuuren, & R. Cole, "Advances in Children's Speech Recognition within an Interactive Literacy Tutor", May 2, 2004, Proc. HLT-NAACL 2004, pp. 25-28.

International Search Report and Written Opinion of PCT/US2008/051582 filed on Jan. 21, 2008.

D. Giuliani & M. Gerosa, "Investigating Recognition of Children's Speech", Apr. 6, 2003, Proc. ICASSP 2003 vol. 2, pp. 137-140.

S. Banerjee, J. Mostow, J. Beck & W. Tam, "Improving Language Models by Learning from Speech Recognition Errors in a Reading Tutor that Listens", Dec. 15, 2003, Proc. ICAAI 2003.

S. Narayanan & A. Potamianos, "Creating Conversational Interfaces for Children", Feb. 1, 2002, IEEE Transactions on Speech and Audio Processing 2002 vol. 10 pp. 65-78.

V. Zue, S. Seneff, J. Polinofri, H. Meng, & J. Glass, "Multilingual Human-Computer Interactions: From Information Access to Language Learning", Oct. 3, 1996, Proc. ICSLP 1996.

J. Mostow, S. Roth, A. Hauptmann, & M. Kane, "A Prototype Reading Coach that Listens", Jul. 31, 1994, Proc. AAAI 1994.

J. Mostow, "Is ASR Accurate Enough for Automated Reading Tutors, and How Can We Tell?", Sep. 17, 2006, Interspeech 2006—ICSLP.

S. Banerjee, J. Beck, & J. Mostow, "Evaluating the Effect of Predicting Oral Reading Miscues", Sep. 1, 2003, Proc. 8th Euro. Conference on Speech Communication and Technology.

D. Yu, Y.C. Ju, Y.Y. Wang, A. Acero, "N-Gram Based Filler Model for Robust Grammar Authoring", May 15, 2006, Proc. ICASSP 2006.

Y.C. Ju, Y.Y. Wang, A. Acero, "Call Analysis with Classification Using Speech and Non-Speech Features", May 15, 2006, Proc. ICASSP 2006.

K. Lee, A. Hagen, N. Romanyshyn, S. Martin, B. Pellom, "Analysis and Detection of Reading Miscues for Interactive Literacy Tutors", Aug. 23, 2004, Proc. Coling 2004.

G. Riccardi, R. Pieraccini, E. Bocchieri, "Sochastic Automata for Language Modeling", Oct. 1, 1996, Computer Speech and Language, vol. 10, pp. 265-293.

A. Hagen, B. Pellom, "A Multi-Layered Lexical-Tree Based Token Passing Architecture for Efficient Recognition of Subword Speech Units", Apr. 25, 2005, Proc. 2nd Language & Technology Conf. 2005.

J. Duchateau, M. Wigham, K. Demuynck, H. Van Hamme, "A Flexible Recognizer Architecture in a Reading Tutor for Children", May 20, 2006, SRIV 2006—ITRW on Speech Recognition and Intrinsic Variation.

U.S. Appl. No. 11/655,702, filed Jan. 19, 2007 Prosecution History including: Application; drawings; Dec. 22, 2009 Non-Final Rejection, Apr. 22, 2010 Amendment; May 14, 2010 Final Rejection; Aug. 12, 2010 Amendment. Total pp. 100.

A. Hagen, B. Bellom, & R. Cole, "Children's Speech Recognition with Application to Interactive Books and Tutors" http://cslr.colorado.edu/beginweb/publication/conference/hagen-asru 2003 Nov. 30, 2003, Proc. ASRU 2003, pp. 186-191.

* cited by examiner

FIG. 5

AUTOMATIC READING TUTORING USING DYNAMICALLY BUILT LANGUAGE MODEL

BACKGROUND

It is well recognized that reading is an important skill for all people, including children, and that reading ability is a fundamental skill without which success in today's world is extremely difficult. The reading level of children is an important measurement of a society's overall education. However, in both developed and developing countries, there is evidence that an insufficient number of teachers exist to provide effective reading tutoring for young children and others who may be first learning to read.

Because of the importance of reading as a basic building block for the education of all peoples, especially children, and because of the lack of available human resources to provide adequate tutoring for all students, there is an ongoing need to provide automated systems and methods that can tutor students in the development of their reading skills.

The discussion above is merely provided for general background information and is not intended to be used as an aid in determining the scope of the claimed subject matter.

SUMMARY

In one illustrative embodiment, a method of providing automatic reading tutoring is disclosed. The method includes retrieving a textual indication of a story from a data store and creating a language model including constructing a target context free grammar indicative of a first portion of the story. The method further includes receiving a first acoustic input and employing a speech recognition engine to recognize the first acoustic input. An output of the speech recognition engine is compared to the language model and a signal is provided to a user interface indicative of whether the output of the speech recognition matches at least a portion of the target context free grammar.

In another illustrative embodiment, another method of providing automatic reading tutoring is discussed. The method includes receiving a textual indication of a story, building a target context free grammar at runtime based on a portion of the textual indication, and prompting a user for an utterance. The method provides a received acoustic signal of the user's utterance to a speech recognition engine. An output from the speech recognition engine is compared to the target context free grammar and an indication of the comparison is stored in a data store.

In still another illustrative embodiment, a system for providing automatic reading tutoring is discussed. The system includes a portable hardware device, an operating system layer installed on the portable hardware device, including a speech recognition engine, and an application layer, including a language model with a target context free grammar configured to be compiled at runtime.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
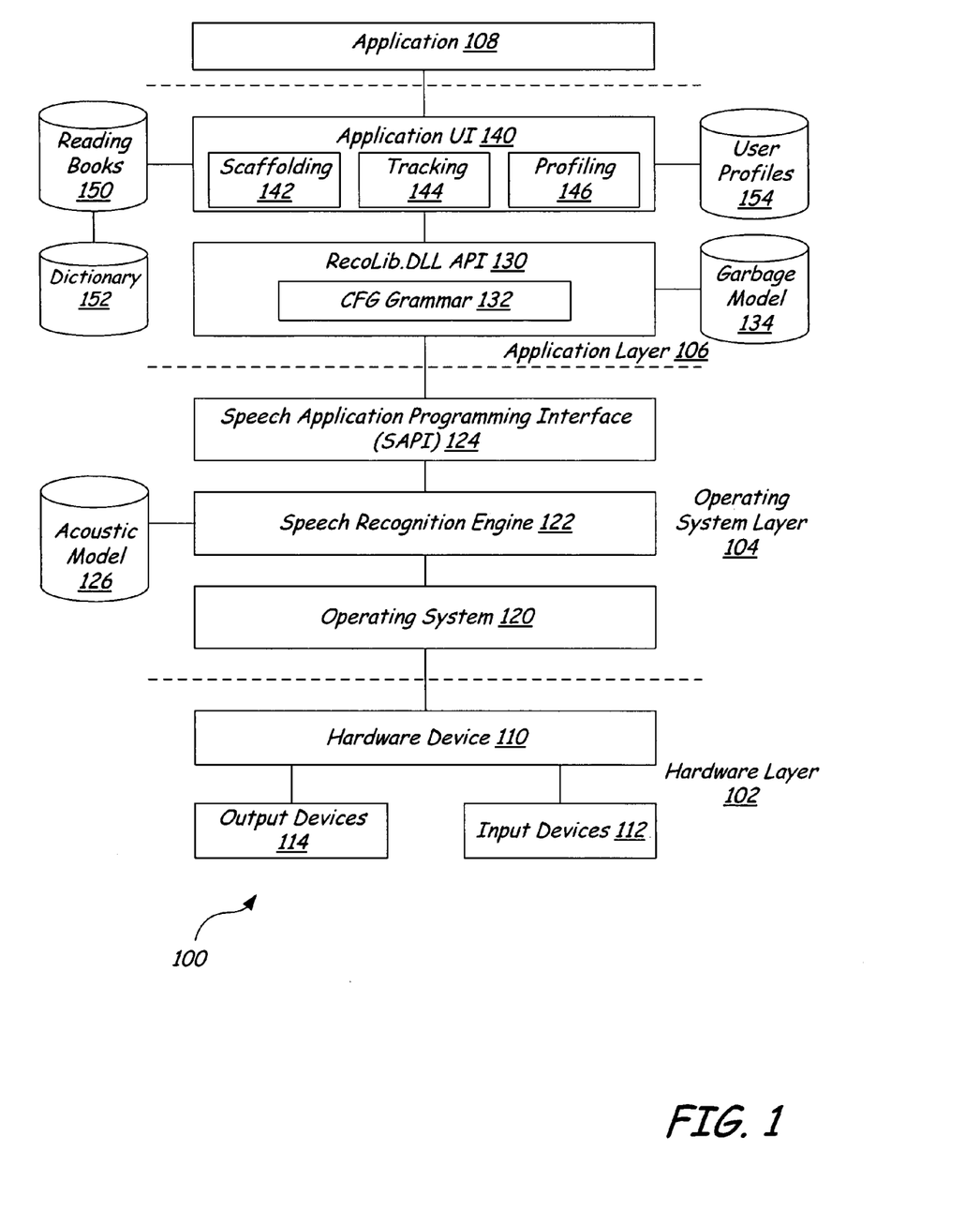
FIG. 1 is a block diagram illustrating an architectural system for an automatic reading tutoring system according to one illustrative embodiment.

FIG. 1 provides an illustrative architectural diagram of an automatic reading tutoring system 100, which is an interactive tool that uses speech recognition to assist children and others in learning to improve their oral reading ability according to one illustrative embodiment. The automatic reading tutoring system 100 illustratively includes a hardware layer 102, an operating system 104 and an application layer 106, which is illustratively exposed to an application 108. The application illustratively provides a story on a display, which the user then reads aloud. Details of an illustrative application will be provided in more detail below. The hardware layer 102 includes a hardware device 110, which provides computing power, memory, a power supply and the like. The hardware device 110 is in communication with one or more output devices 112 and one or more input devices 114 to receive and provide information to a user.

Figure 5:
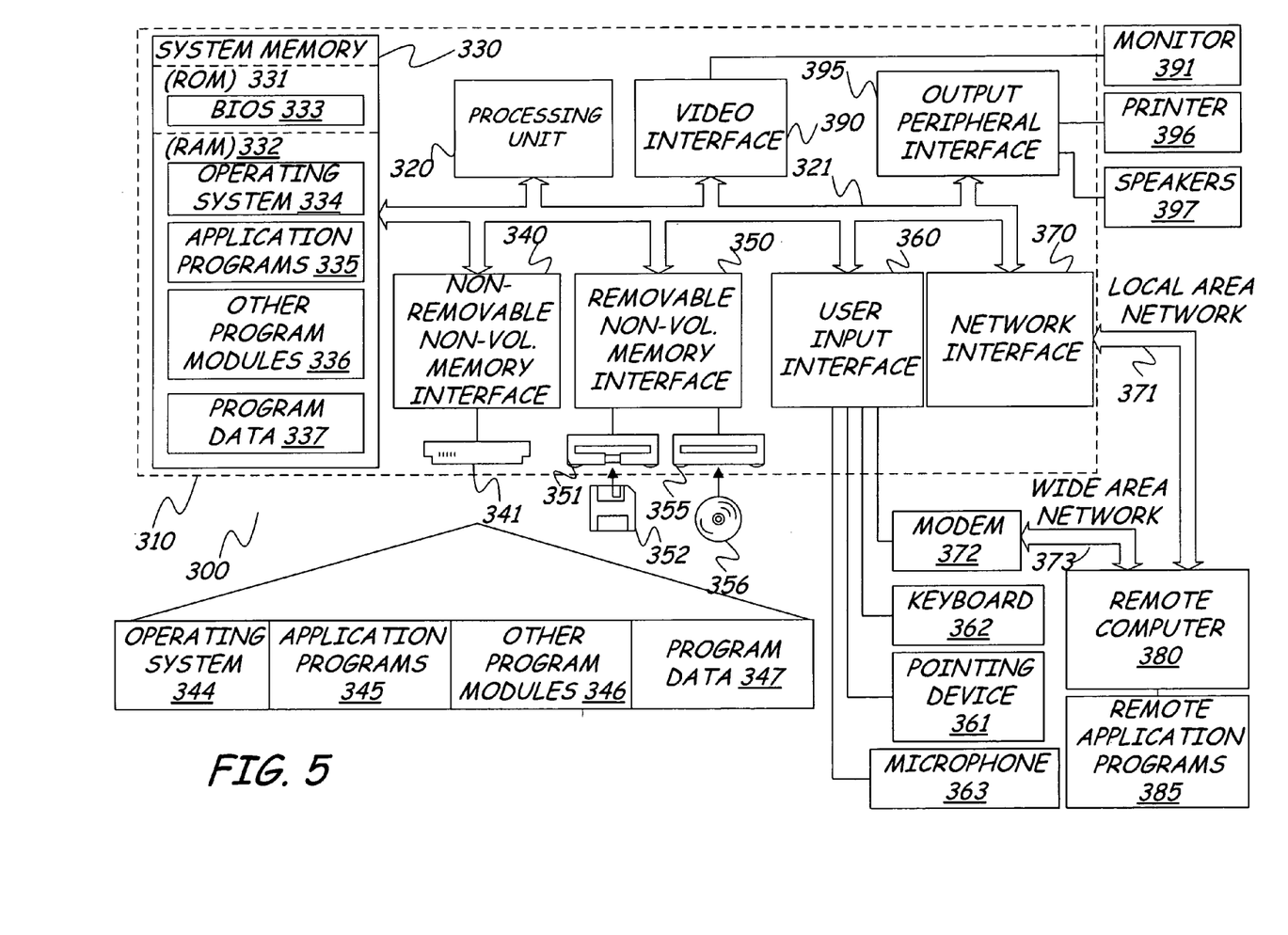
FIG. 5 is a block diagram of one computing environment in which some embodiments may be practiced.

Several different types of devices have the capability of providing computing power, memory, and the like. One example of such a device is illustrated in FIG. 5 and will be described in more detail below. Implementing the automatic reading tutoring system 100 on a hardware device such as a desktop personal computer, though, has some distinct disadvantages. For example, it is difficult for a young child to operate desktop based computing systems without guidance from a teacher, parent, or other adult. In addition, use of such a system is often limited to classroom situations. Students often wear headphones in group settings, which can cause problems by introducing noise and distortions to speech signals when children play with them or move them, as they tend to do. Furthermore, because access to desktop personal computers may be limited to classroom situations, the amount of time that students can use the automatic reading tutoring system when implemented on a desktop personal computer may be limited to classroom time. Furthermore, it has been found that input devices such as keyboards and mice can be difficult for children to operate.

To overcome some of these challenges, in one illustrative embodiment, the hardware device 110 is illustratively a hand held device, such as a tablet personal computer, or other similar type of device. Such a device illustratively includes an integrated display, thereby providing an output device 114. Furthermore, such devices can include input devices 112 such as an integrated microphone array including any number of microphones integrated into the device, and a touch sensitive input area to receive input from a stylus or via direct physical contact by the user.

The operating system layer 104 illustratively includes an operating system 120, a speech recognition engine 122, and a speech application programming interface (SAPI) 124. The operating system 120 can be any known operating system, including, for example various versions of Microsoft Windows™ operating systems manufactured by Microsoft Corporation of Redmond, Wash. The speech recognition engine 122 illustratively supports both dictation and command and control grammars and accesses an acoustic model 126, which includes information that the speech recognition engine 122 employs to recognize speech and convert the speech to a textual representation of thereof. The acoustic model 126 is illustratively trained to recognize specific types of speech. Children's speech is very different from that of adults because children have immature articulation apparatuses and language skills. Furthermore, as a child ages, his or her articulation apparatuses and language skills change, this is to say, mature. Thus, the acoustic model data store 126 illustratively includes acoustic models trained from a large amount of children's speech data.

The SAPI 124 is illustratively implemented in the operating system layer 104 and is exposed to the application layer 106 to provide an interface between an application and the operating system 120 and more specifically between an application and the speech recognition engine 122. The SAPI 124 can be any acceptable API capable of providing a proper speech recognition interface.

The application layer 106 is illustratively composed of two parts an API 130, illustratively named RecoLib.DLL, that is exposed to the application 108 and is also capable of interfacing with the operating system layer 104 and an application user interface 140, which illustratively provides a number of functions related to interactions made by the user via the application 108. The API 130 illustratively calls the SAPI 124 to engage the speech recognition engine 122 for the purposes of performing speech recognition. The API 130 includes a target context free grammar 132 that is robust and efficient. The target context free grammar 132 is illustratively dynamically built for every particular application and is capable of detecting reading miscues when working with the trained acoustic model 126. The context free grammar 132 is capable of accessing a garbage model 134, which the target context free grammar 132 uses to detect reading miscues.

Figure 2:
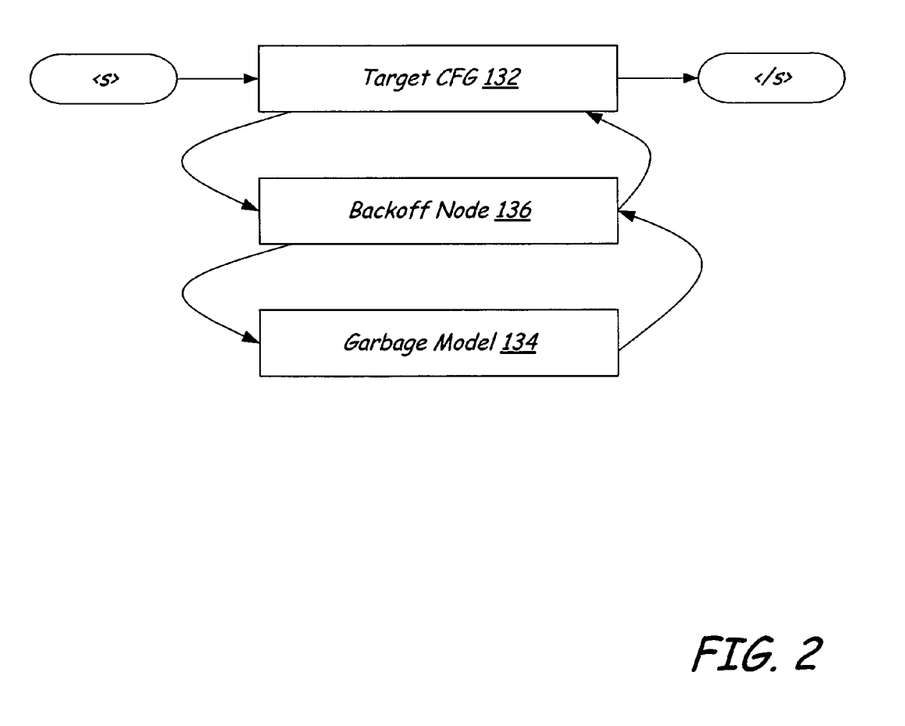
FIG. 2 is a block diagram of a language model for use with the automatic reading tutoring system illustrated in FIG. 1.

FIG. 2 illustrates a language model 138 that shows the relationship between the target context free grammar 132 and the garbage model 134. The target context free grammar 132 is aligned in parallel with the garbage model 134. A backoff node 136 is a unigram node that connects the context free grammar 132 with the garbage model 134. As speech is recognized, the backoff node 136 provides a path between the target context free grammar 132 and the garbage model 134 to identify any errors made by the user.

Figure 3:
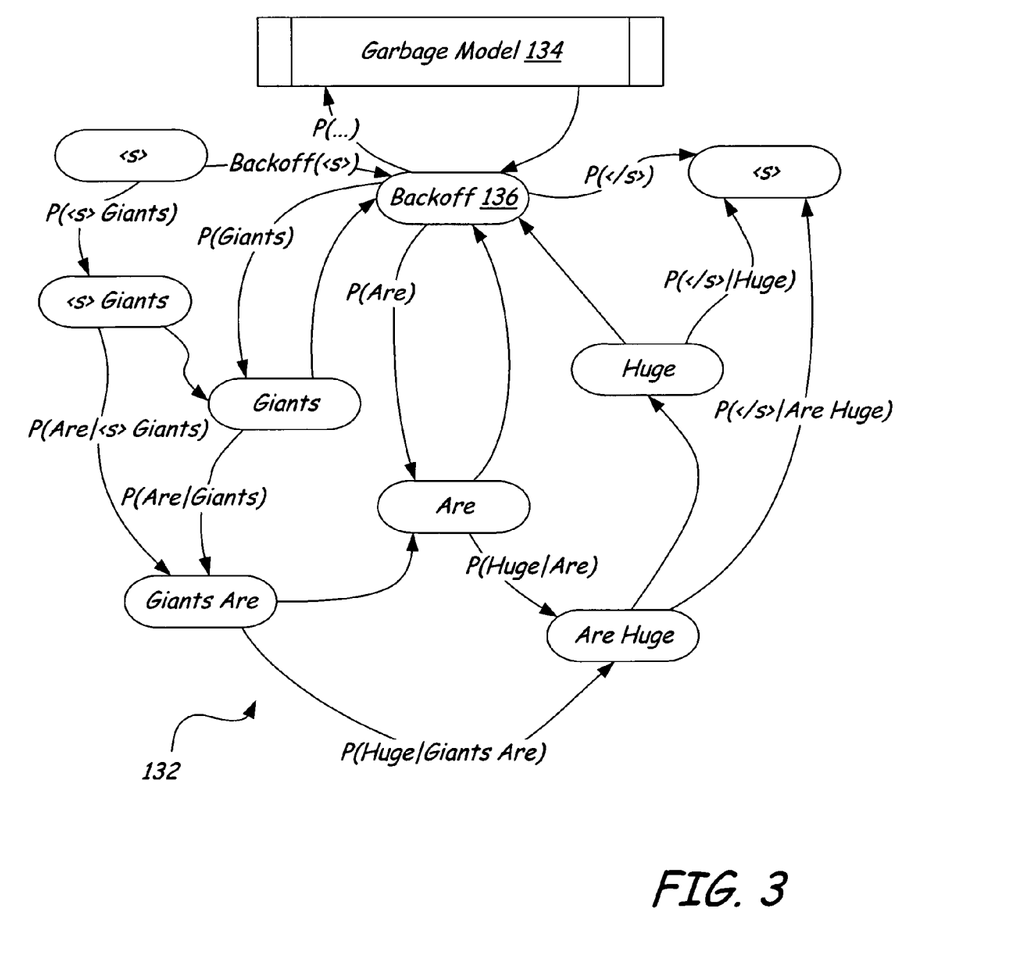
FIG. 3 is a more detailed block diagram of the language model of FIG. 2, illustrating an N-Gram target grammar.

FIG. 3 provides an exemplary illustration of the language model 138 in more detail. The target context free grammar 132 is illustratively an N-gram, which is created at runtime of the sentence "Giants are huge" and the garbage model 134 is a list of common words in a general domain.

The language model 138 is efficient because both target context free grammar 132 and garbage model 134. The size of the target context free grammar 132 is small (on the order of only kilo bytes) because the current story text (paragraph or sentence) is short, so the building procedure can be done at runtime when a particular sentence in a story is encountered. The size of the garbage model 134 can be selected with different levels of complexity from trigram, bigram to unigram. Experiments have shown only small differences in detection and false alarm rates using different orders in the garbage model 134. A further strength of the garbage model 134 is that it can be shared by different sentences or paragraphs, which can save loading overhead in runtime. Using this efficient language model 138 enables achievable real-time word-level tracking on hand-held devices.

Language model 138 is also robust in detecting reading miscues because the garbage model 134 is illustratively composed of most common words in English so that it can absorb all words not matched by context free grammar 132. Even for out-of-vocabulary words or sub-word level reading miscues, the garbage model 134 can also absorb them by outputting words that are acoustically similar.

The application layer 106 also includes an application user interface 140. The application user interface illustratively includes three engines: a scaffolding engine 142, a tracking engine 144, and a profiling engine 146. The scaffolding engine 142 illustratively provides online help information to teach a user how to pronounce a word, read a whole sentence, or explain the meaning of a word. The scaffolding engine 142 accesses a reading book data store 150, which includes stories to be read by a user including animation, video, audio, and text elements associated displaying a story on an output device 114. The scaffolding engine 142 illustratively communicates with output devices 114 to provide indications of the elements to the appropriate devices. The scaffolding engine 142 is also illustratively capable of accessing dictionary data store 152, which stores information related to word level scaffolding information including pronunciations, lexicons, grapheme-phoneme mappings, sight words lists or function words list.

The tracking engine 144 is capable of tracking a user's oral reading of a story in real-time speed. The tracking engine 144, illustratively provides information to a display, identifying the next word to be pronounced. In addition, the tracking engine 144 detects any reading miscues including stops, pauses, mispronunciations, and partial pronunciations.

The profiling engine 146 illustratively measures and reports the progress of the users, including providing information regarding reading fluency level, new vocabulary learned, testing scores and the like. The profiling engine 146 is capable of accessing a user profile data store 148, which illustratively includes information related to persons who have used the product such as a reading level of the user, reading progress or how the user has progress from one level to the next, a list of words that the user has had difficulty with, or any other information that might be useful, including preference settings for the user interface. The profiling engine 146 illustratively accesses the stored information in the user profiles data store 154 to write or read data related to a particular user.

Figure 4:
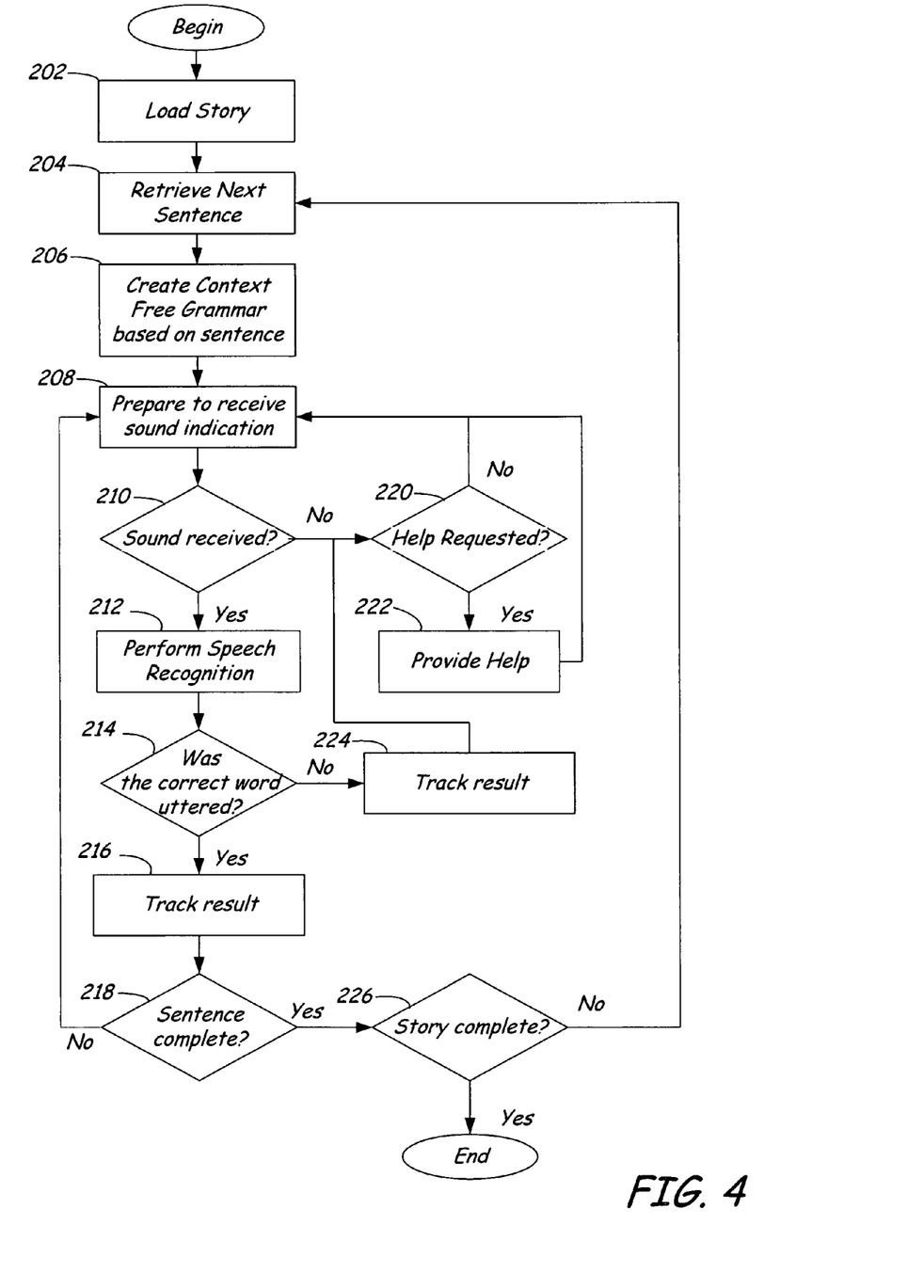
FIG. 4 is flow diagram illustrating a method of using the automatic tutoring system illustrated in FIG. 1.

FIG. 4 illustrates a method 200 of using an application 108 to perform automatic reading tutoring according to one illustrative embodiment. The method begins by loading a story from the reading books data store 150 into the application 108 and/or application user interface 140. This is illustrated by block 202. The story, as described above, illustratively includes text, audio, visual, and/or animated elements, which are provided to the user via one or more of the output devices 114. For example, automatic reading tutoring system 100 illustratively includes a display, which presents text, pictures, and animations related to the particular story loaded into the application 108.

When the story is load into the application, at least a portion of the beginning of the story is displayed so that a user can begin to read the story. The application retrieves the next sentence from the story, which in this case is the first sentence. This is illustrated by block 204. By retrieving the sentence, it is loaded into memory and is highlighted on the display so that the user knows that the selected sentence is to be read next.

Once a sentence is selected, a context free grammar is created to represent the target context free grammar 132. This is represented by block 206. In one illustrative embodiment, the target context free grammar 132 is limited in size to one sentence at a time. Alternatively, it can be larger or smaller, as is advantageous.

The automatic reading tutoring system 100 then prepares to receive a sound indication as is indicated at block 208. If at block 210 a sound is received, the automatic reading tutoring system 100 performs speech recognition to determine whether sound is an utterance. This is indicated at block 212.

At decision block 212, it is determined whether the correct word, that is, the next word in the sentence was uttered. If it was, that result is tracked, as illustrated at block 216 and the method then checks to see if the sentence has been completed by the user. This is illustrated at block 218. If the sentence is completed, the method checks to see whether the story is complete at block 226. If the story is complete, the method is ended. If the story is not completed, the method 200 returns to block 204 to retrieve the next sentence.

Returning to block 218, if the sentence is not completed, the method returns to block 208 to prepare to receive the next sound indication. Returning to block 214, if the correct word was not uttered, the result is tracked, including whether the word was mispronounced, partially pronounced, or the like. If the user has requested help, at block 220, help is provided to the user. Help can be given in the form of audible, visual, or other indications. After help is provided, the method 200 then returns to block 208 to prepare to receive a sound indication.

The embodiments discussed above provide several advantages. For example, previously reported systems for automatic reading tutoring are mainly targeting on desktop-based scenarios where children still need to sit in front of the desktop computing systems, wear a headset, and use the system under the watch of teachers or parents as in regular classroom studies. Because there is limited classroom time and/or the need of adult supervision to assist young children to use desktop computing systems, this scenario limits the amount of time available for children's reading practice.

In addition, the use of headset usually causes difficulties for children since they tend to play with it and it easily adds noise and distortions into the speech signals due to common misplacement and movement of the headset. The embodiments discussed above build an automatic reading tutoring system which targets on hand-held devices with a stylus and built-in microphone array. With such an un-tethered system, children will have better accessibility and flexibility in practice, and may have more freedom and a greater degree of personalization for themselves instead of being watched by their parents or teachers all the time. It is also easier for children to use a stylus than mouse/keyboard to operate a device.

FIG. 5 illustrates an example of a suitable computing system environment 300 on which embodiments may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 5 illustrates operating system 334, application programs 335, other program modules 336, and program data 337.

The computer 310 may also include other removable/non-removable volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 5, provide storage of computer readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 5 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 5 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing reading tutoring, comprising:
retrieving an indication of a text from a data store;
constructing a target context free grammar that is indicative of a portion of the text;
constructing a garbage model that is indicative of a list of common words in a general domain;
receiving an acoustic input;
converting the acoustic input to a textual representation utilizing a speech recognition engine;
comparing the textual representation of the acoustic input to the target context free grammar;
comparing the textual representation of the acoustic input to the garbage model; and
providing a miscue signal to a user interface indicating that the acoustic input was mispronounced based on a determination that the textual representation of the acoustic input does not match a portion of the target context free grammar and that the textual representation of the acoustic input does match a portion of the garbage model; and
wherein the miscue signal indicates a miscue determination made by an engine tracking miscues, the miscue being selected from a group consisting of a stop, a pause, a mispronunciation, and a partial pronunciation.

2. The method of claim 1 and further comprising:
connecting the target context free grammar to the garbage model utilizing a unigram node.

3. The method of claim 2 and further comprising:
aligning the target context free grammar in parallel with the garbage model.

4. The method of claim 1 and further comprising:
associating the miscue signal with a user and storing an indication of the association in the data store.

5. The method of claim 1 and further comprising:
utilizing a user interface element to provide online help information that is associated with the portion of the text.

6. The method of claim 5, wherein providing the online help information includes providing a visual display of textual information related to the portion of the text.

7. The method of claim 5, wherein providing the online help information includes providing an audible signal related to the portion of the text.

8. The method of claim 5, wherein providing the online help information includes providing information related to a pronunciation of a word in the portion of the text.

9. The method of claim 5, wherein providing the online help information includes providing information related to a meaning of a word in the portion of the text.

10. A method of providing reading tutoring, comprising:
- receiving a textual indication of a story;
- building a target context free grammar at runtime based on a portion of the textual indication;
- obtaining a garbage model that is indicative of a list of words in a general domain;
- prompting a user for an utterance;
- providing a received acoustic signal of the user's utterance to a speech recognition engine;
- comparing an output from the speech recognition engine to the target context free grammar;
- comparing an output from the speech recognition engine to at least a portion of the garbage model;
- storing an indication of the comparison to at least one of the target context free grammar and the garbage model in a data store including an indication of the user who provided the utterance;
- utilizing a miscue engine to identify a miscue based on the comparison to at least one of the target context free grammar and the garbage model, wherein identifying the miscue comprises identifying a miscue selected from a group consisting of a stop, a pause, a mispronunciation and a partial pronunciation;
- reporting progress of the user based at least in part on the stored indication; and
- wherein reporting progress comprises reporting the miscue.

11. The method of claim 10 and further comprising:
- retrieving previously stored data related to the user; and
- wherein reporting progress of the user includes providing information associated with a reading fluency level of the user.

12. The method of claim 10, and further comprising:
- providing feedback related to miscues in the user's utterance; and
- wherein reporting progress of the user includes providing a list of words that the user has mispronounced.

13. The method of claim 10, and further comprising:
- providing an acoustic model that is trained for use in the speech recognition engine, wherein the data for training the acoustic model includes data from a plurality of children.

14. A system for providing automatic reading tutoring, comprising:
- a portable hardware device;
- an operating system layer installed on the portable hardware device, including a speech recognition engine;
- an application layer, including a language model with a target context free grammar configured to be compiled at runtime for a portion of text when the portion of text is retrieved for display to a user, the application layer also including a garbage model that is indicative of words in a general domain, the application layer providing a textual output;
- a user interface that displays the textual output and indications of a plurality of engines, a first one of the plurality of engines providing help information, a second one of the plurality of engines tracking reading miscues, the miscues being selected from a group consisting of a stop, a pause, a mispronunciation, and a partial pronunciation, and a third one of the plurality of engines measuring progress of a user.

15. The system of claim 14, wherein the language model further comprises:
- a garbage model; and
- a backoff node accessible by the garbage model and the target context free grammar.

16. The system of claim 14, wherein the first one of the plurality of engines displays video from a data store on the user interface.

17. The system of claim 16, wherein the second one of the plurality of engines tracks the reading miscues in real-time.

18. The system of claim 17, wherein the third one of the plurality of engines includes information related to a reading level of the user and preference settings for the user.

* * * * *